(12) United States Patent
Yuan et al.

(10) Patent No.: US 11,703,842 B2
(45) Date of Patent: Jul. 18, 2023

(54) METHOD AND DEVICE FOR ACQUIRING DATA OF DATA SOURCES ASSOCIATED WITH PRODUCTION LINE

(71) Applicant: Siemens Aktiengesellschaft, Munich (DE)

(72) Inventors: Zhou Yuan, Wuhan (CN); Yi Liu, Wuhan (CN); Ming Yu, Wuhan (CN); Qi Wang, Wuhan (CN); Yue Hua Zhang, Wuhan (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 195 days.

(21) Appl. No.: 17/297,519

(22) PCT Filed: Nov. 29, 2018

(86) PCT No.: PCT/CN2018/118188
§ 371 (c)(1),
(2) Date: May 27, 2021

(87) PCT Pub. No.: WO2020/107328
PCT Pub. Date: Jun. 4, 2020

(65) Prior Publication Data
US 2022/0011759 A1 Jan. 13, 2022

(51) Int. Cl.
*G05B 19/418* (2006.01)
*G06F 11/30* (2006.01)
(Continued)

(52) U.S. Cl.
CPC .... *G05B 19/41885* (2013.01); *G06F 11/3013* (2013.01); *G06F 11/3428* (2013.01); *G05B 2219/31449* (2013.01); *G06F 16/22* (2019.01)

(58) Field of Classification Search
None
See application file for complete search history.

(56) References Cited

U.S. PATENT DOCUMENTS

2016/0364445 A1* 12/2016 Golec .................. G06F 16/285

FOREIGN PATENT DOCUMENTS

| CN | 102737086 A | 10/2012 |
|---|---|---|
| CN | 105988430 A * | 10/2016 |

(Continued)

OTHER PUBLICATIONS

International Search Report dated Sep. 5, 2019.
(Continued)

*Primary Examiner* — Isaac Tuku Tecklu
(74) *Attorney, Agent, or Firm* — Harness, Dickey & Pierce, P.L.C.

(57) ABSTRACT

Provided in an embodiment of the present disclosure is a method for acquiring data of a data source associated with a production line, including: acquiring a semantic model, the semantic model including semantic relationships between respective semantic units and data source identifiers corresponding to one or more production lines; receiving production line identifiers and acquiring one or more semantic units; converting, based upon the semantic model, the one or more semantic units to data source identifiers corresponding to production lines indicated by the production line identifiers; and acquiring data of data sources indicated by the data source identifiers. Implementing the embodiments disclosed in the present disclosure simplifies a configuration file required for a virtual model of a production line, thereby greatly reducing configuration workload, and enhancing convenience of acquiring data of a data source.

18 Claims, 7 Drawing Sheets

(51) Int. Cl.
    *G06F 11/34*     (2006.01)
    *G06F 16/22*     (2019.01)

(56) References Cited

FOREIGN PATENT DOCUMENTS

| CN | 105988430 A | | 10/2016 | |
|---|---|---|---|---|
| CN | 108873847 A | * | 11/2018 | ............... B21J 5/02 |
| CN | 108873847 A | | 11/2018 | |
| EP | 2990960 A1 | | 3/2016 | |
| EP | 3107050 A1 | | 12/2016 | |

OTHER PUBLICATIONS

Eugene Siow; "Efficient querying for analytics on internet of things databases and streams"; Feb. 8, 2018; XP055541972; Retrieved from the Internet: URL:https://eprints.soton.ac.uk/418468/1/Final_thesis.pdf [retrieved on Jan. 15, 2019].

* cited by examiner

METHOD AND DEVICE FOR ACQUIRING DATA OF DATA SOURCES ASSOCIATED WITH PRODUCTION LINE

PRIORITY STATEMENT

This application is the national phase under 35 U.S.C. § 371 of PCT International Application No. PCT/CN2018/118188 which has an International filing date of Nov. 29, 2018, the entire contents of each of which are hereby incorporated herein by reference.

FIELD

The present disclosure generally relates to the field of industrial control, in particular to a method and device for acquiring data of data sources associated with a production line, computing equipment, a computer-readable storage medium and a program product.

BACKGROUND

Key performance indexes (KPIs) are economic and technical indexes for evaluating a process and a performance. As benchmarks and references of a production process in a factory, KPIs are used to evaluate and optimize the production process so that the production process can be continuously improved. Various KPIs, for example, yield, productivity and load rate of plant, are usually defined for each production line in a factory. KPI values obtained according to the KPI calculation formulas may be compared with given KPI baseline values to evaluate whether the expected target is achieved.

In the prior art, a cloud server, in which the calculation formulas of various KPIs of each production line are stored, is usually used to perform such calculations. When KPIs need to be calculated, a virtual model is first established for each production line, variables in the KPI calculation formulas and associated data sources are bound in a model configuration file according to the relationships between the variables in the KPI calculation formulas and data of data sources (for example, sensor) of the production line, and the established virtual model of the production line is uploaded to the cloud server.

Then, when calculating a KPI of a production line, the calculation engine in the cloud server decomposes the KPI calculation formula according to certain calculation rules (for example, the priority of an operator), reads data of the required data source according to the corresponding model configuration file, substitutes the acquired data of the data source into the KPI calculation formula, and performs calculations according to the calculation rules to obtain the KPI.

SUMMARY

In the prior methods for calculating KPIs of production lines, when a model needs to be established for different production lines in a factory, variables in the KPI calculation formulas need to be associated with data sources in the configuration file so that data of data sources can be obtained for KPI calculations. Therefore, when the number of production lines is large, a lot of complex configurations are required at the stage of model establishment, and the configurations cannot be flexibly suitable for different applications.

A first embodiment of the present disclosure provides a method for acquiring data of data sources associated with a production line, and the method comprises: acquiring a semantic model, the semantic model comprising semantic relationships between each of a plurality of semantic units and the corresponding data source identifiers of at least one production line, receiving production line identifiers and acquiring at least one semantic unit, converting the at least one semantic unit to the corresponding data source identifiers of the production lines indicated by the production line identifiers based on the semantic model, and acquiring data of the data sources indicated by the data source identifiers.

In the present embodiment, by establishing a semantic model and establishing semantic relationships between semantic units and data source identifiers of data sources associated with a production line in the semantic model, the configuration file of the virtual model of the production line can be simplified. Thus, the configuration workload is greatly reduced and data of the data sources can conveniently be obtained.

A second embodiment of the present disclosure provides a device for acquiring data of data sources associated with a production line, and the device comprises: a model acquisition unit, configured to acquire a semantic model, the semantic model comprising semantic relationships between each of a plurality of semantic units and the corresponding data source identifiers of at least one production line, a receiving unit, configured to receive production line identifiers and acquiring at least one semantic unit, a conversion unit, configured to convert the at least one semantic unit to the corresponding data source identifiers of the production lines indicated by the production line identifiers based on the semantic model, and a data acquisition unit, configured to acquire data of the data sources indicated by the data source identifiers.

A third embodiment of the present disclosure provides computing equipment, and the computing equipment comprises a processor and a memory, configured to store computer-executable instructions. When executed, the computer-executable instructions enable the processor to execute the method described in the first embodiment.

A fourth embodiment of the present disclosure provides a computer-readable storage medium. The computer-readable storage medium contains computer-executable instructions stored therein, and the computer-executable instructions are configured to execute the method described in the first embodiment.

A fifth embodiment of the present disclosure provides a computer program product, the computer program product is tangibly stored in a computer-readable medium and comprises computer-executable instructions, and at least one processor executes the method described in the first embodiment when the computer-executable instructions are executed.

BRIEF DESCRIPTION OF THE DRAWINGS

The drawings and the detailed description of the invention will make more obvious the characteristics, advantages and other aspects of the embodiments of the present disclosure. A plurality of embodiments of the present disclosure are shown for an example purpose, instead of a restrictive purpose.

DETAILED DESCRIPTION OF THE EXAMPLE EMBODIMENTS

The example embodiments of the present disclosure are described in detail below by reference to the drawings. Although the example method and device described below comprise software and/or firmware executed on hardware of other components, it should be noted that these examples are only illustrative, but not restrictive. For example, it should be considered that any or all hardware, software and firmware components are executed exclusively in hardware, exclusively in software, or in any combination of hardware and software. Therefore, although the example method and device have been described below, those skilled in the art should easily understand that the examples provided are not used to restrict the way of implementing the method and device.

In addition, the flowchart and the block diagram in the drawings show the system architecture, functions and operations which may be implemented by the method and system according to the embodiments of the present disclosure. It should be noted that the functions marked in the blocks may happen in a sequence other than the one marked in the drawings. For example, two connected blocks may actually be performed basically concurrently or may sometimes be performed in an opposite sequence, depending on what functions they involve. It should also be noted that each block in the flowchart and/or block diagram, or a combination of blocks in the flowchart and/or block diagram may be implemented by use of a special hardware-based system performing a specified function or operation, or implemented by use of a combination of special hardware and computer instructions.

The terms "include" and "comprise" and similar terms used in the document are open terms and mean "include/comprise but are not limited to", indicating that other contents may be further included. The term "based on" means "at least partially based on." The term "one embodiment" means "at least one embodiment", and the term "another embodiment" means "at least another embodiment."

Figure 1:
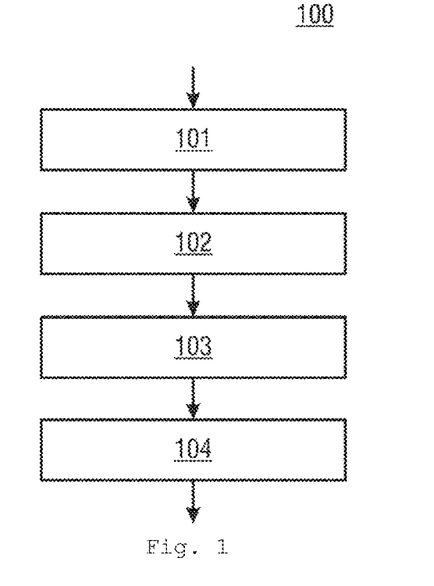
FIG. 1 is a flowchart of the method for acquiring data of data sources associated with a production line according to one embodiment of the present disclosure.

FIG. 1 is a flowchart of the method for acquiring data of data sources associated with a production line according to one embodiment of the present disclosure. As shown in FIG. 1, the method 100 starts with Step 101. In Step 101, a semantic model is acquired, and the semantic model comprises semantic relationships between each of a plurality of semantic units and the corresponding data source identifiers of at least one production line. A semantic unit is an information expression unit helping human beings to understand, and usually has a universal expression in the industrial field. For example, the variables "good_num3", "good_num1" and "bad_num1" in the KPI calculation formula yield_rate=good_num3/(good_num1+bad_num1) are semantic units, respectively. For example again, when the information about the materials required for the next order of a production line in a factory is to be found, the semantic units involved may be "find next order" to "find material". These semantic units usually correspond to data of data sources associated with the production line. For example, in the above-mentioned KPI calculation formula yield_rate=good_num3/(good_num1+bad_num1), the semantic units "good_num3", "good_num1" and "bad_num1" respectively represent data collected by an associated sensor device in a production line, and the data source is a sensor device. The semantic units "find next order" to "find material" represent order data and material data pre-stored in the database associated with the production line.

The semantic model can associate semantic units with data sources. As mentioned above, data sources may be sensor devices in the production line or the database storing data of the production line. Data sources may be identified by data source identifiers. In some embodiments, a data source identifier comprises at least one of the following: network address of a data source, identification code of the data source, and attribute of the data source. In other embodiments, a data source identifier may further be any other information that uniquely identifies a data source. Therefore, if a data source identifier is obtained from a semantic unit, data can be obtained from the corresponding data source indicated by the data source identifier. Thus, after semantic units and data source identifiers are connected with semantic relationships in the semantic model, the associations between semantic units and data sources can be provided. Semantic relationships are inclusion relationships or connection relationships, for example. A specific embodiment is given below to describe in detail a semantic model by reference to FIG. 3.

In some embodiments, a uniform semantic model may be established for all production lines in a factory. That is to say, the semantic model may include semantic relationships between all semantic units involved by all production lines in the factory and corresponding data source identifiers. A production line may involve more than one semantic unit, while each semantic unit may also involve more than one production line. Thus, in the semantic model, a semantic relationship connects each semantic unit of a plurality of semantic units with the corresponding data source identifier of the production line involved. In this way, each semantic unit is mapped to the corresponding data source identifier of the involved production line of the semantic unit. Therefore, compared with the prior art, it is unnecessary to associate semantic units with data sources in the configuration file for each production line. The uniform semantic model established for a factory is not only suitable for different production lines in the factory, but also easy to expand. When a new production line is set up in the factory, only the semantic model needs to be modified, that is, only information related to the new production line needs to be added in the semantic model.

In other embodiments, Step 101 further comprises the following sub-steps:

First, establish a virtual model of at least one production line based on the characteristic information and production sequence of constituent parts of at least one production line. Products in a practical production line will go through different constituent parts of the production line for a series of operations such as transfer production and test. For this purpose, to let the virtual model correspond to the practical production line, it is necessary to acquire the characteristic information of the constituent parts of the production line and the production sequence (namely, production processes) of the product in the production line. In some embodiments, the constituent parts may comprise different workstations of the production line and various equipment at different workstations, for example, controller, sensor device and action equipment. The controller may be a programmable logic controller (PLC), intelligent device or smart industrial Internet of things (IIoT) gateway, the sensor device may be a sensor, button or code scanner, and the action equipment may be a motor or a manipulator. The action equipment is used to perform operations on the product or drive the equipment which operates the product, the sensor device is used to sense some variables required to be collected during the production, for example, time, displacement, quantity, and specific features of the product. The controller, communication-coupled with the sensor device and the action equipment, sends control signals to the sensor device and the action equipment to control them and receives data sensed by the sensor device. In some embodiments, the establishment of a virtual model for a production line is mainly for the purpose of the production line performance analysis. Therefore, the characteristic information of constituent parts may include information related to the production line performance analysis, such as process relationships between workstations, functions/attributes/network addresses of various equipment at workstations, and connection/control relationships between various equipment.

Next, create a contextual information library based on the virtual model. The contextual information library comprises contextual information of data sources of at least one production line. In some embodiments, a uniform semantic model is established for all production lines in a factory, and accordingly, the contextual information library comprises contextual information of various data sources associated with all production lines in the factory.

To be specific, contextual information includes equipment information indexed by a production line and data source information indexed by a semantic unit. The equipment information indexed by a production line may specifically include characteristic information (for example, attribute and connection relationship) and the production sequence of constituent parts (for example, workstation and equipment at a workstation) of the production line, while data source information indexed by a semantic unit may include associations between the semantic unit and data sources.

Then, connect each of the plurality of semantic units and the corresponding data source identifiers of at least one production line with semantic relationships based on the virtual model, the plurality of semantic units and the contextual information library to form the semantic model. The plurality of semantic units may come from the summarization and induction in the prior production line performance analysis method. Each of a plurality of semantic units is connected to corresponding data source identifiers of a production line involved with semantic relationships by using various index relationships in the contextual information library and the plurality of semantic units on the basis of the virtual model of at least one production line, and thus the semantic model is formed.

A specific embodiment will be given below to describe in detail the establishment process of the semantic model by reference to FIGS. 3 and 4. It should be pointed out that after the semantic model is established, the above-mentioned sub-steps are not necessary for the execution of the method.

Continue to see FIG. 1. Then, the method 100 goes to Step 102. In Step 102, production line identifiers are received and at least one semantic unit is acquired. A production line identifier represents a specific production line. In other embodiments, the step of acquiring at least one semantic unit further comprises: receiving a production line data acquisition request and analyzing the production line data acquisition request to acquire at least one semantic unit. In these embodiments, the acquisition of a semantic unit requires an analysis of a production line data acquisition request. In other embodiments, at least one semantic unit may directly be received. In some embodiments, a production line data acquisition request contains KPI calculation formulas and semantic units are variables in the KPI calculation formulas. The analysis of a KPI calculation formula comprises decomposing the calculation formula into a plurality of semantic units according to the operation rules (for example, priorities of four arithmetic operators) in the calculation formula. However, in other embodiments, a production line data acquisition request may contain a calculation formula or data acquisition request associated with other production lines. For example, in a data acquisition request "find material information of next order" for a production line, the semantic units obtained after the analysis are "find next order" and "find material".

Then, in Step 103, at least one semantic unit is converted to the corresponding data source identifiers of the production line indicated by the production line identifiers based on the semantic model. In this step, the at least one semantic unit obtained can be converted to data source identifiers of the production lines indicated by the production line identifiers according to the semantic relationships between semantic units and specific data source identifiers associated with a specific production line in the semantic model.

Then, the method 100 goes to Step 104 of acquiring data of data sources indicated by data source identifiers. So far, data of corresponding data sources may be obtained according to data source identifiers. In other embodiments, Step 104 further comprises acquiring data of data sources indicated by the data source identifiers from a database, wherein the database stores data of data sources of at least one production line in the form of a uniform structure. For example, the controller at each workstation enables data of the sensor device communication coupled with the controller to be stored in the database in the form of a uniform structure.

In other embodiments, the method 100 further comprises receiving data of data sources of at least one production line and storing the data in a database in the form of a uniform structure (not shown in the figure). After data of data sources of production lines are received, converted into a uniform data structure and stored in the database, data of data sources indicated by data source identifiers can be obtained from the database for unified management and storage, which also improves the efficiency of data analysis and calculation. In addition, data can flexibly be applied to different applications. For example, data can be used by other platforms or applications.

In other embodiments, the method 100 further comprises analyzing the performance of the production line based on predetermined analysis rules and the data of data sources to acquire an analysis result (not shown in the figure). Predetermined analysis rules may be rules set arbitrarily. For example, in some embodiments, according to the KPI calculation formulas and the acquired data of data sources, the calculation results of KPIs can be obtained by calculating the KPI formulas based on predetermined operation rules (for example, rules for four arithmetic operations).

Next, the method for acquiring data of data sources associated with a production line in FIG. 1 is described by reference to a specific embodiment. In the present embodiment, acquiring data of data sources associated with a production line is to calculate the KPI of the production line. Each production line may have one or more KPIs, for example, yield rate (YR), real average cycle time (RACT), and first pass yield (FPY). In the present embodiment, one factory has a uniform semantic model.

Figure 2:
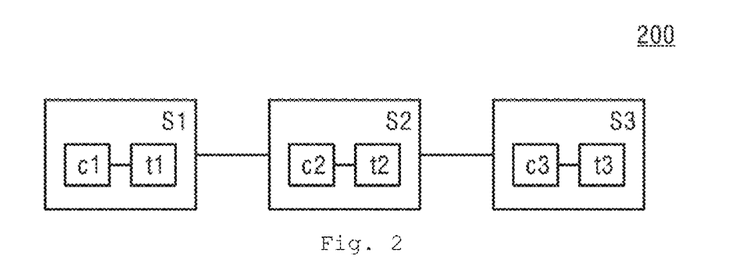
FIG. 2 is a schematic diagram of a production line in a factory according to one embodiment of the present disclosure.

FIG. 2 is a schematic diagram 200 of a production line in a factory according to one embodiment of the present disclosure. For the sake of simplicity, the production line L1 shown in FIG. 2 has three workstations S1, S2 and S3 and a controller and a sensor device are disposed at each workstation. In other embodiments, the production line may have any other number of workstations and any number of controllers and sensor devices may be disposed at each workstation. Each controller can control any number of sensor devices and receive data from the sensor device, and the sensor device may have different functions, for example, functions of detecting the quantity, time, displacement, and a property of products. The data may be collected for different purposes. For example, detecting the quantity can be used for calculating the yield rate, and detecting the time can be used for analyzing the production capacity of the production line.

In the present embodiment, the working process of products in the production line L1 is from workstation S1 to workstation S2 and then to workstation S3. Controllers c1, c2 and c3 and sensor devices t1, t2 and t3 communication-communicated with these controllers are disposed at these workstations, respectively. The sensor devices t1, t2 and t3 can be used to respectively sense whether products produced at corresponding workstations S1, S2 and S3 comply with the production standards at these workstations, count the products which comply with the production standards and the products which do not comply with the production standards at corresponding workstations, respectively, and send corresponding data to the controllers c1, c2 and c3. In other embodiments, the counting function may be completed by the controllers c1, c2 and c3, that is to say, the sensor devices t1, t2 and t3 sends a signal indicating whether products produced at corresponding workstations S1, S2 and S3 comply with the production standards at the workstations to the controllers c1, c2 and c3, and the controllers c1, c2 and c3 count the products which comply with the production standards and the products which do not comply with the production standards, respectively, to generate corresponding data accordingly.

In the present embodiment, for the production line L1 shown in FIG. 2, the calculation formula of the yield rate is defined as: yield_rate=good_num3/(good_num1+bad_num1). good_num1 and bad_num1 represent the quantity of products which comply with the production standard at workstation S1 and the quantity of products which do not comply with the production standard at workstation S1 within a predetermined period of time, respectively. Similarly, good_num3 represents the quantity of products which comply with the production standard at workstation S3 within a predetermined period of time. Products which do not comply with the production standard at workstation S1 will not go to workstation S2, and products which do not comply with the production standard at workstation S2 will not go to workstation S3. Thus, the quantity of products complying with the production standard at workstation S3 represents the quantity of good products of the whole production line L1. Therefore, the yield rate is the ratio of the quantity of products complying with the production standard at workstation S3 to the total quantity of products produced at workstation S1, namely, good_num3/(good_num1+bad_num1).

A production line L1 in a factory and the calculation formula of a KPI, yield rate, are described above. A factory may have other production lines. In addition, each production line may have other KPI definitions, and these KPIs have corresponding calculation formulas, respectively.

The specific process of the method for acquiring data of data sources associated with a production line is described below. First, a semantic model is established. The first step of establishing a semantic model is to establish a virtual model of the production line. As mentioned above, a factory has a uniform semantic model. Accordingly, it is necessary to establish the virtual models of all production lines. A virtual model can be established through any prior modeling tool and can be presented on a user interface.

As an example, the production line L1 is described below. In the present embodiment, a virtual model of the production line L1 is established based on the characteristic information and production sequence of constituent parts of the production line L1. The purpose of acquiring data of data sources associated with the production line is to calculate the KPI of the production line in the present embodiment. Thus, only data of sensor devices is related and information related to action equipment at workstations is not required.

Accordingly, action equipment is unnecessarily involved in the virtual model. In the present embodiment, workstations S1, S2 and S3 of the production line L1, process relationships between workstations (that is, the output of workstation S1 is the input of workstation S2, and the output of workstation S2 is the input of workstation S3), connection and control relationship between controller c1 and sensor device t1, attributes, functions and network addresses at workstation S1, connection and control relationship between controller c2 and sensor device t2, attributes, functions and network addresses at workstation S2, and connection and control relationship between controller c3 and sensor device t3, attributes, functions and network addresses at workstation S3 are involved in the virtual model.

Next, a contextual information library is created based on the virtual model of the production line. The contextual information library comprises contextual information of data sources of at least one production line. As mentioned above, in the present embodiment, a factory has a uniform semantic model. Accordingly, it is necessary to create a contextual information library comprising contextual information of various data sources associated with all production lines in the factory. The contextual information of the production line L1, for example, is described below.

In the present embodiment, data collected by controllers c1, c2 and c3 from sensor device t1, t2 and t3 is received at predetermined intervals (for example, 1 s) during the production of the production line and is stored in a uniform format in a database. Therefore, data sources are sensor devices t1, t2 and t3 and the contextual information comprises:

1) KPI Definitions and Equipment Information Indexed by the Production Line L1.

```
{
   lineEntity:L1,
   hasStations:[S1, S2, S3]
   hasKPI:[YR, RACT, FPY]
   {
   hasParameters:[startTime, endTime]
   }
}
{
   stationEntity:S1,
   hasControllers:[c1],
   hasSensorDevices:[t1],
}
{
   stationEntity:S2,
   hasControllers:[c2],
   hasSensorDevices:[t2],
}
{
   stationEntity:S3,
   hasControllers:[c3],
   hasSensorDevices:[t3],
}
{
   controllerEntity:c1,
   hasPoints:[point1,point2,point3],
   hasRelations:[
      {
         from:t1,
         to:point1
      }
   ]
}
{
   controllerEntity:c3,
   hasPoints:[point1],
   hasRelations:[
      {
         from:t3,
         to:point1
      }
   ]
}
......
```

The contextual information above indicates that the production line L1 has three workstations S1, S2 and S3, and the production line L1 has KPI definitions of YR, RACT and FPY. Since the KPI calculation of YR is related to the data of the data sources in a predetermined period of time, the contextual information further comprises KPI related parameters and these parameters include the start time and end time of the target period of time, which should be input at the time of calculation. However, if KPIs to be calculated are not related to the period of time in other embodiments, the contextual information may not include these parameters. The workstation S1 has the controller c1 and the sensor device t1, the workstation S2 has the controller c2 and the sensor device t2, and the workstation S3 has the controller c3 and the sensor device t3. The controller c1 has data points: point1 (data point 1), point2 (data point 2) and point3 (data point 3), and data point point1 is communication-connected with the sensor device t1 to receive data from the sensor device t1. For the purpose of description, only a part of KPI definitions and equipment information indexed by the production line L1 are exemplified above. Similarly, KPI definitions and equipment information indexed by the production line L1 further include data point point2 of the controller c1, information about the connection relationships of data points, information about the controller c2, and information about other KPI definitions of the production line L1.

2) Data Source Information Indexed by Semantic Units

```
{
   semanticUnit:good_num1,
   measuredBy:t1,
   database:b1
}
{
   semanticUnit:bad_num1,
   measuredBy:t1,
   database:b1
}
{
   semanticUnit:good_num3,
   measuredBy:t3,
   databse:b1
}
......
```

The contextual information above indicates that the data corresponding to the semantic unit good_num1 is the data collected by the sensor device t1, the data corresponding to the semantic unit bad_num1 is the data also collected by the sensor device t1, the data corresponding to the semantic unit good_num3 is the data collected by the sensor device t3, and all the data is stored in the database b1. For the purpose of description, only a part of data source information indexed by semantic units is exemplified above. Similarly, data source information indexed by semantic units further includes information related to other semantic units involved by the production line L1.

In other embodiments, if the purpose of acquiring data of data sources is not to calculate KPIs, the contextual information may exclude KPI definitions indexed by the production line L1.

Then, each of the plurality of semantic units is connected to the corresponding data source identifiers of the production line with semantic relationships based on the virtual model, the plurality of semantic units and the contextual information library to form the semantic model. Again, the production line L1 is taken for example. In this step, the constituent parts of the production line L1, the attributes of the constituent parts, the semantic units good_num1, bad_num1 and good_num3 and data sources involved by the semantic units are connected with semantic relationships based on the virtual model of the production line L1 and the contextual information in the contextual information library. FIG. 3 shows a part of the semantic model of a production line according to the example in FIG. 2. From FIG. 3, it can be seen that the constituent parts (including the workstations, controllers and sensor devices) of the production line L1, the attributes (including KPI definitions, data points the controller has, and database in which data is stored) of the constituent parts, semantic units good_num1, bad_num1 and good_num3, and data sources involved by the semantic units are connected with semantic relationships.

Figure 3:
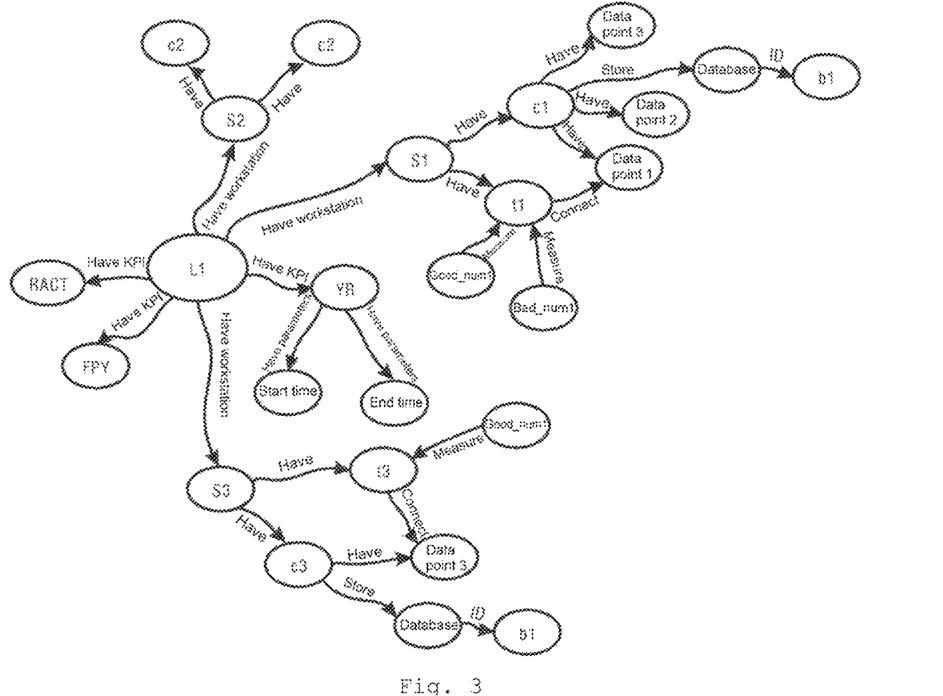
FIG. 3 shows a part of the semantic model of a production line according to the example in FIG. 2.

From a part of the semantic model in FIG. 3, it can be seen L1 has three workstations S1, S2 and S3, and has a KPI definition of YR and another two KPI definitions of RACT and FPY. YR has the parameters of start time and end time. The workstation S1 has the controller c1 and the sensor device t1, and the controller c1 has data points of point1, point2 and point3, wherein data point 1 is connected to the sensor device t1 to receive data from the sensor device t1. The controller c1 stores data received by the data points 1 to 3 in the database whose ID is b1. Similarly, the workstation S3 has the controller c3 and the sensor device t3, the controller c3 has the data point 1 which is connected to the sensor device t3 to receive data from the sensor device t3. The controller c3 stores data received by the data point 1 in the database whose ID is b1. The workstation S2 has the controller c2 and the sensor device t2. The data corresponding to the semantic units good_num1 and bad_num1 is sensed by the sensor device t1, while the data corresponding to the semantic unit good_num3 is sensed by the sensor device t3.

In the present embodiment, the data source identifiers are the data point 1 of the controller c1 at the workstation S1 and the data point 1 of the controller c3 at the workstation S3, namely, the connection attributes of the data sources of sensor devices t1 and t3 with the controllers c1 and c3. Therefore, the semantic relationships between the semantic units good_num1 and bad_num1 and the data point 1 of the controller c1 at the workstation S1, and between the semantic unit good_num3 and the data point 1 of the controller c3 at the workstation S3 are contained in the semantic model.

In other embodiments, besides the attributes of a data source, a data source identifier may further include the network address of a data source, the identification code of a data source, a combination of the network address and the identification code, or other identification information that uniquely identifies a data source.

The production line L1 is taken for example to describe the establishment process of a semantic model above. It should be pointed out FIG. 3 only shows a part of a semantic model. Since a uniform semantic model is established in a factory in the present embodiment, the semantic relationship between each semantic unit of the semantic units involved by all production lines in the whole factory and the corresponding data source identifier of the production line involved by the semantic unit is included in the semantic model.

After the semantic model is established, data of the expected data sources can be acquired based on the semantic model. As mentioned above, after a semantic model is determined, the above-mentioned steps of establishing the semantic model are not necessary steps.

The KPI calculation formula of the YR of the production line L1 is still taken for example to describe the method for acquiring data of data sources associated with the production line. In the present embodiment, the production line identifier L1, the KPI calculation formula of YR: yield_rate=good_num3/(good_num1+bad_num1), and time parameters are received. The time parameters include start time and end time (for example, 10:00-11:00) and indicate that data in the period between the start time and the end time needs to be acquired. In other embodiments, the parameters may be other types of parameters, or no such parameters are involved.

Then, the KPI calculation formula is analyzed. After the formula is decomposed according to the operation rules for four arithmetic operations, the semantic units good_num1, bad_num1 and good_num3 are extracted. Then, these semantic units are converted to corresponding data source identifiers of the production line L1, namely, the data point 1 of the controller c1 at the workstation S1 and the data point 1 of the controller c3 at the workstation S3, based on the semantic model shown in FIG. 3, and the database ID obtained is b1.

Then, corresponding data of these data points is acquired from the database b1 having a uniform data structure according to the time parameters. The database having the uniform data structure can receive data of various data sources of the production line at predetermined intervals (for example, 1 s) and convert the data into a uniform structure for data construction. For example, fields such as production line identifier, data source type, data source identification code, data point, network address of controller, network address of data source, data type, data, and timestamp can be created as a uniform structure to store data of data sources. Table 1 below shows a part of the database b1 in the example.

TABLE 1

| Example of the database b1 | | | | | | | | |
|---|---|---|---|---|---|---|---|---|
| Production line identifier | Data source type | Data source ID code | Data point | Network address of controller | Network address of data source | Data type | Data | Time-stamp |
| L1 | Sensors | 0001 | S1, c1, point1 | 192.168.1.222 | 192.168.1.333 | good_num | 2 | 10:00:01 |
| L1 | Sensors | 0001 | S1, c1, point1 | 192.168.1.222 | 192.168.1.333 | bad_num | 0 | 10:00:01 |
| L1 | Sensors | 0002 | S2, c2, point1 | 192.168.1.444 | 192.168.1.555 | good_num | 2 | 10:00:01 |
| L1 | Sensors | 0002 | S2, c2, point1 | 192.168.1.444 | 192.168.1.555 | bad_num | 0 | 10:00:01 |
| L1 | Sensors | 0003 | S3, c3, point1 | 192.168.1.666 | 192.168.1.777 | good_num | 1 | 10:00:01 |
| L1 | Sensors | 0003 | S3, c3, point1 | 192.168.1.666 | 192.168.1.777 | bad_num | 1 | 10:00:01 |
| L1 | Sensors | 0001 | S1, c1, point1 | 192.168.1.222 | 192.168.1.333 | good_num | 2 | 10:00:02 |
| L1 | Sensors | 0001 | S1, c1, point1 | 192.168.1.222 | 192.168.1.333 | bad_num | 0 | 10:00:02 |
| L1 | Sensors | 0002 | S2, c2, point1 | 192.168.1.444 | 192.168.1.555 | good_num | 2 | 10:00:02 |
| L1 | Sensors | 0002 | S2, c2, point1 | 192.168.1.444 | 192.168.1.555 | bad_num | 0 | 10:00:02 |
| L1 | Sensors | 0003 | S3, c3, point1 | 192.168.1.666 | 192.168.1.777 | good_num | 2 | 10:00:02 |
| L1 | Sensors | 0003 | S3, c3, point1 | 192.168.1.666 | 192.168.1.777 | bad_num | 0 | 10:00:02 |
| ... | ... | ... | ... | ... | ... | ... | ... | ... |

Only a part of the example database b1 is shown in Table 1. In Table 1, the data collected by the sensor device t1 at the workstation S1, the sensor device t2 at the workstation S2, and the sensor device t3 at the workstation S3 are the quantities of products that comply with and do not comply with the production standards at the corresponding workstations; therefore, the data type is number of good products or number of bad products, respectively. In addition, it is clear that the data is stored in the database b1 at intervals of 1 second. In the present embodiment, a KPI-related time parameter (for example, start time 10:00:00 and end time 11:00:00) is also received; therefore, on the basis of a data source identifier acquired by semantic model conversion, the data between the start time and the end time is acquired from the database b1. For example, it is possible to read all the data that is in the time period from 10:00:00 to 11:00:00, whose data point is "S1, c1, data point 1", whose data types are "Number of good products" and "Number of bad products", and in which the data type of the data point "S3, c3, data point 1" is "Number of good products"; the data is the data required to calculate the KPI of the yield rate.

In the example database, in addition to sensors, the "data source type" field may further include other sensor devices, such as a button, a barcode scanner, or any other device that generates data. Accordingly, the "data type" field can vary with the type of data collected by a data source.

After acquisition of the corresponding data required to calculate the KPI of the yield rate, on the basis of the formula for calculating a KPI, the yield rate is calculated according to a calculation rule (for example, operator priority). Specifically, data whose data point is "S1, c1, data point 1" and whose data type is "Number of good products" are added up as a value of the semantic unit good_num1 (number of good products 1), data whose data point is "S1, c1, data point 1" and whose data type is "Number of bad products" are added up as a value of the semantic unit bad_num1 (number of bad products 1), and data whose data point is "S3, c3, data point 1" and whose data type is "Number of good products" are added up as a value of the semantic unit good_num3 (number of good products 3). Next, the value of good_num1 (number of good products 1) and the value of bad_num1 (number of bad products 1) are added up, and then the value of good_num3 (number of good products 3) is divided by the sum to acquire the value of the yield rate.

In other embodiments, in addition to the start time and end time, the time parameter may further include a time interval. For example, for data of measurement type (for example, measurement displacement), a predetermined time interval (for example, 5 seconds) may be set in the time parameter. In other words, it is possible to, as needed, acquire data at a predetermined time interval from the database, instead of acquiring data all the time from a data source from the database. In addition, in other embodiments, the time parameter may further include a specific time, so as to acquire data at a specific time of a data source from the database. Alternatively, in other embodiments, the data in a database may also be time-independent data; for example, the database may be a static database. Therefore, in such an embodiment, for acquisition of data in a database, it is not necessary to set time parameters.

Figure 4:
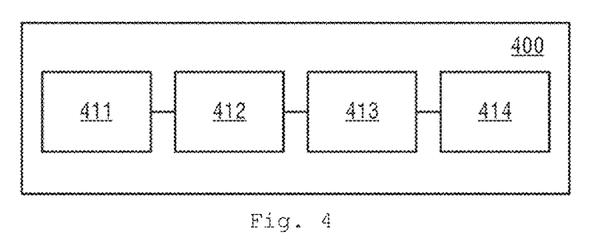
FIG. 4 is a block diagram of the device for acquiring data of data sources associated with a production line according to one embodiment of the present disclosure.

FIG. 4 shows an apparatus for acquiring data of a data source associated with a production line according to an embodiment of the present disclosure. As shown in FIG. 4, the device 400 comprises a model acquisition unit 411, a receiving unit 412, a conversion unit 413, and a data acquisition unit 414. The model acquisition unit 411 is configured to acquire a semantic model, the semantic model comprising semantic relationships between each of a plurality of semantic units and the corresponding data source identifiers of at least one production line. The receiving unit 412 is configured to receive production line identifiers and acquire at least one semantic unit. The conversion unit 413 is configured to convert at least one semantic unit into the corresponding data source identifiers of the production lines indicated by the production line identifiers based on the semantic model. The data acquisition unit 414 is configured to acquire data of the data source indicated by the data source identifiers. Each unit in FIG. 4 may be implemented by software, hardware (for example, an integrated circuit and FPGA), or by a combination of software and hardware.

In other embodiments, the model acquisition unit 411 is further configured to: establish a virtual model of at least one production line based on the characteristic information and production sequence of constituent parts of at least one production line, create a contextual information library based on the virtual model, the contextual information library comprising contextual information of data sources of the at least one production line, and connect each of the plurality of semantic units and the corresponding data source identifiers of the at least one production line with semantic relationships based on the virtual model, the plurality of semantic units and the contextual information library to form the semantic model.

In other embodiments, the data acquisition unit 414 is further configured to acquire data of data sources indicated by the data source identifiers from a database, wherein the database stores data of data sources of at least one production line in the form of a uniform structure.

In other embodiments, the device 400 further comprises an interaction unit (not shown) that is configured to receive data of data sources of the at least one production line and store the data in the database in the form of a uniform structure. In other embodiments, the device 400 further comprises an analysis unit (not shown) that is configured to analyze the performance of the production line based on predetermined analysis rules and the data of data sources to acquire an analysis result.

In other embodiments, the receiving unit 412 is further configured to receive a production line data acquisition request, and analyze the production line data acquisition request to acquire the at least one semantic unit. In some embodiments, a production line data acquisition request contains calculation formulas of KPIs, and the analysis unit is configured to calculate the KPIs based on the calculation formulas and the acquired data of data sources to acquire a calculation result.

In other embodiments, a data source identifier comprises at least one of the following: network address of a data source, identification code of the data source, and attribute of the data source.

Figure 5:
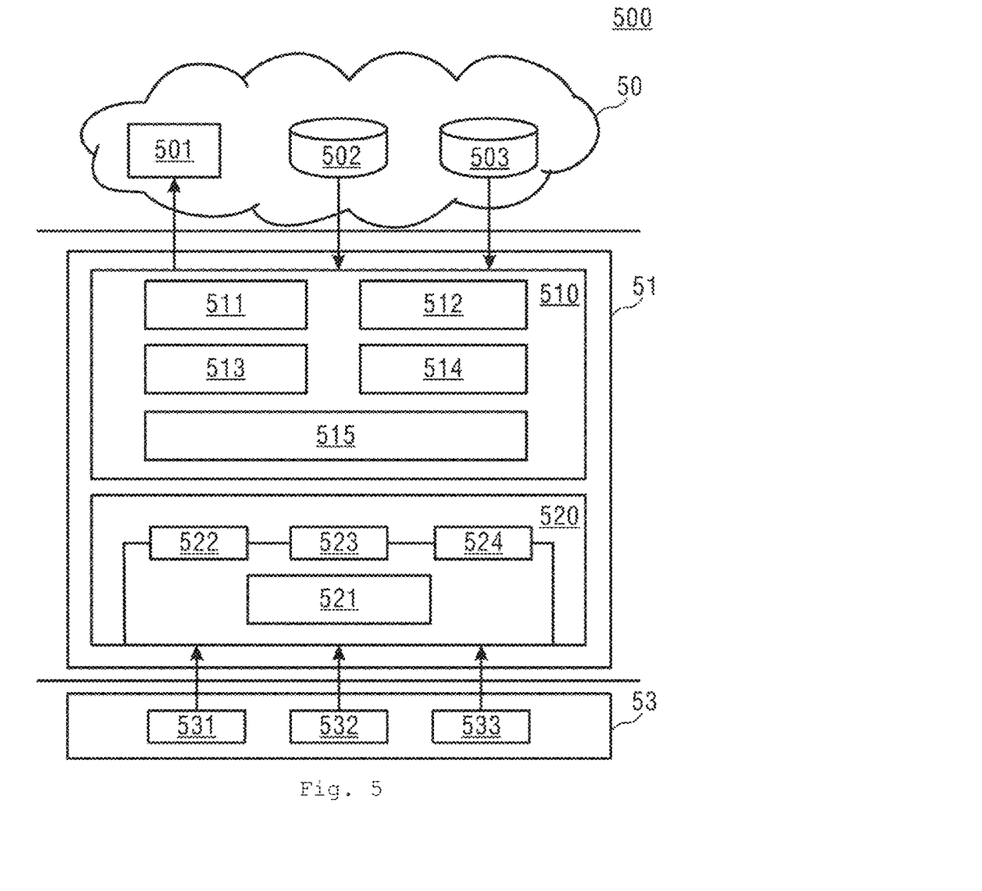
FIG. 5 shows the architecture of a production line performance analysis system according to one embodiment of the present disclosure.

Refer to FIG. 5, which shows the architecture of a production line performance analysis system 500 according to one embodiment of the present disclosure. The production line performance analysis system 500 as shown in FIG. 5 calculates KPIs of a production line in a factory by using the method for acquiring data from various data sources associated with a production line shown in FIG. 1. As shown in FIG. 5, the entire system is divided into three layers: a cloud server 50, a local server 51, and an equipment layer 53. The equipment layer 53 comprises data sources associated with various production lines in the factory, and they provide data to the local server 51 of the factory. The local server 51 implements the method described by reference to FIG. 1 and interacts with the cloud server 50 and the equipment layer 53. The cloud server 51 is used for unified data storage and management for multiple factories.

The operation flow of each component of the production line performance analysis system 500 will be described below by reference to FIG. 5. As shown in FIG. 5, the local server 51 is divided into two platforms: a middleware platform 510 and an equipment service platform 520. The middleware platform 510 comprises a model acquisition unit 511, a receiving unit 512, a conversion unit 513, an acquisition unit 514, and an analysis unit 515. The equipment service platform 520 comprises an interaction unit 521. The model acquisition unit 511 is used to acquire a semantic model, the step of acquiring a semantic model further comprising establishing a semantic model; the process of establishing a semantic model is similar to the steps described by reference to FIGS. 1 to 3. Here, since the cloud server 50 is used in the system 500 as shown in FIG. 5 to uniformly manage multiple factories, after the model acquisition unit 511 establishes a virtual model of a production line at the local server 51 of a factory, the model is uploaded to the cloud server 50. At the same time, KPI calculation formulas related to the production line are also pre-configured on the local server 51, and are also uploaded to the cloud server 50. After receiving a virtual model and KPI calculation formulas, the cloud server uniformly stores them in a KPI calculation formula storage 502 and a production line virtual model storage 503. The cloud server 50 further comprises an instrument panel 501, which is used to display virtual models, KPI calculation formulas, and KPI calculation results of production lines, and can interact with a user.

In addition, the interaction unit 521 of the equipment service platform 520 is communicatively connected to the data sources 531, 532, and 533 of at least one production line of the equipment layer 53, which receives data of each of the data sources 531, 532, and 533, and stores them in a database in the form of a uniform structure. In the embodiment as shown in FIG. 5, the equipment service platform 520 further provides a series of data service interfaces 522, 523, and 524. These data service interfaces are called by the middleware platform 510 to locate data in a database. Therefore, the format of a database having a uniform structure is similar to that described in Table 1, but with the addition of a "data service" field. Data services may include, for example, "getGoodNum (get the number of good products)", "getBadNum (get the number of bad products)", and "getTotalNum (get the total number)".

Therefore, in the present embodiment, when the model acquisition unit 511 establishes a contextual information library in the step of establishing a semantic model, a data service indexed by the semantic unit is also defined in the contextual information library. Still the production line L1 shown in FIG. 2 is taken for example, an example of the contextual information of a data service indexed by a semantic unit is shown.

```
{
    semanticUnit:good_num1,
    hasService:getGoodNum,
    measuredBy:t1,
    dataServer:d1
}
{
    semanticUnit:bad_num1,
    hasService:getBadNum,
    measuredBy:t1,
    dataServer:d1
```

```
}
{
    semanticUnit:good_num3,
    hasService:getGoodNum,
    measuredBy:t3,
    dataServer:d1
}
{
    dataServerEntity:d1,
    hasProperties:[ip],
    hasServices:[getGoodNum,getBadNum]
}
```

As is clear from the contextual information of the example given above, in the present embodiment, the semantic unit good_num1 (number of good products 1) corresponds to the data service of "getGoodNum (get the number of good products)", the semantic unit bad_num1 (number of bad products 1)" corresponds to the data service of "getBadNum (get the number of bad products)", the semantic unit good_num3 (the number of good products 1) corresponds to the data service of "getGoodNum (get the number of good products)", and the data they involve are stored in the data server (that is, the data service platform) d1. The data server d1 has an IP address, and the data services provided include getGoodNum (get the number of good products) and getBadNum (get the number of bad products).

Figure 6:
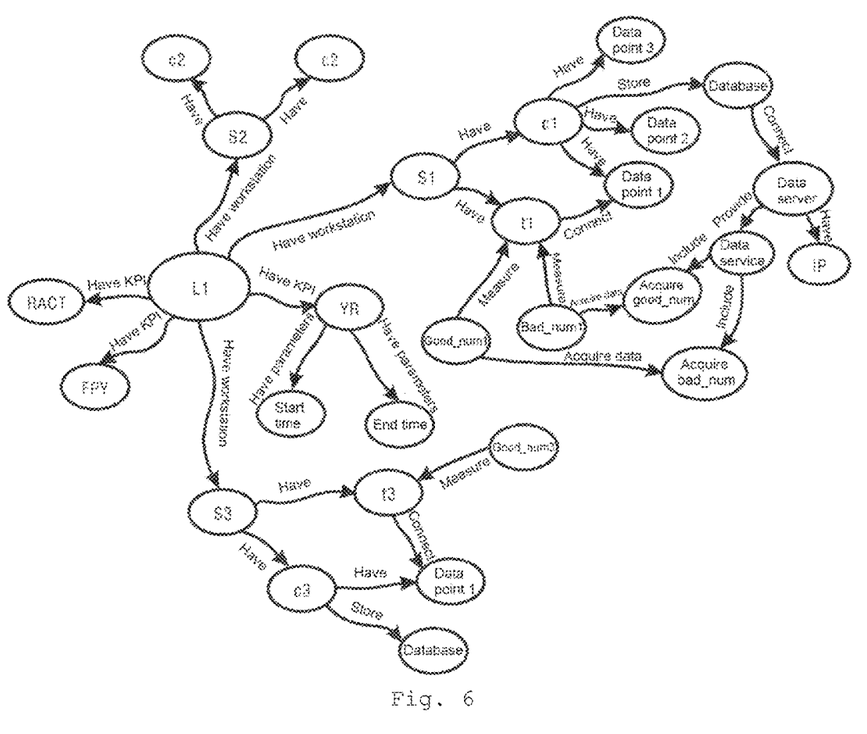
FIG. 6 shows a part of the semantic model of a production line according to the embodiment in FIG. 5.

Therefore, correspondingly, a part of the established semantic model is shown in FIG. 6. As shown in FIG. 6, the data service corresponding to the semantic unit good_num1 (number of good products 1) is getGoodNum (get the number of good products), and the data service corresponding to the semantic unit bad_num1 (the number of bad products 1) is getBadNum (get the number of bad products), both of which are data services provided by the data server.

It should be noted that FIG. 6 only shows a part of the semantic model. In the present embodiment, a uniform semantic model is established for each production line of a factory; therefore, a semantic model should include semantic relationships between each semantic unit among all semantic units involved by all the production lines and corresponding data source identifiers and also data services of the production lines involved by the semantic unit. After a semantic model is established, the semantic model may be stored in a local memory (not shown) of the local server 51. When the model acquisition unit 511 needs to acquire a semantic model, the semantic model may be directly read from the memory.

Still referring to FIG. 5, when calculating a designated KPI of a designated production line, a user can select the designated production line and a designated KPI calculation formula by the instrument panel 501 of the cloud server 50. The cloud server 50 sends the designated production line identifier and KPI calculation formula to the receiving unit 512 of the middleware platform 510. The receiving unit 512 analyzes the KPI calculation formula to acquire at least one semantic unit. A KPI calculation formula may be analyzed according to predetermined rules (for example, priorities of four arithmetic operators).

Based on a semantic model acquired by the model acquisition unit 511, the conversion unit 513 may convert at least one semantic unit into a corresponding data source identifier and data service, and acquire the IP address of the data server. The data acquisition unit 314 invokes the corresponding data service interface from the IP address of the data server, locates the corresponding data source in the database according to the data source identifier, and acquires its data. Similar to the embodiment described by reference to FIGS. 2 and 3, when selecting a production line and a KPI calculation formula, a user can also accordingly input time parameters related to the selected KPI calculation formula, thereby selecting the corresponding data from the database according to the time parameters.

After data of the data source is acquired, the analysis unit 315, on the basis of the acquired data, calculates a KPI value according to the KPI calculation formula, and sends it to the cloud server for display on an instrument panel 301. In the present embodiment, KPI calculation is performed on the local server, and a calculation result is displayed only on the instrument panel 301 of the cloud server. Therefore, compared with the prior art, this eliminates the need to transmit data of the data sources involved in the calculation to a cloud server, thereby allowing an improvement of the cost-effectiveness of data transmission.

In other embodiments, the local server 51 is further provided with an instrument panel (not shown); thus, a user can select a designated production line and KPI calculation formula at the local server 51, and the local server 51 calculates a KPI value for display on the instrument panel.

Figure 7:
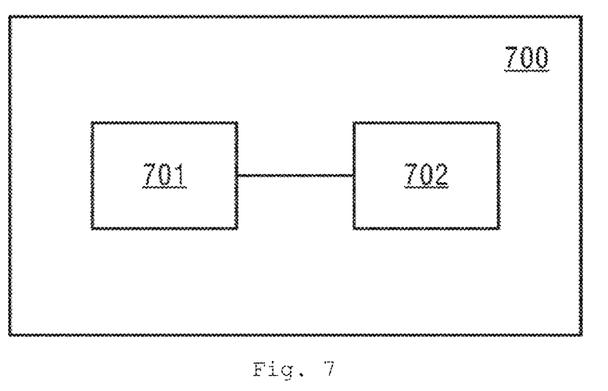
FIG. 7 is a block diagram of the computing equipment for acquiring data of data sources associated with a production line according to one embodiment of the present disclosure.

FIG. 7 is a block diagram of the computing equipment 700 for acquiring data of data sources associated with a production line according to one embodiment of the present disclosure. FIG. 7 clearly shows that the computing equipment 700 used to acquire data of a data source associated with a production line comprises a processor 701 and a memory 702 that is coupled to the processor 701. The memory 702 is used to store a computer-executable instruction that, when executed, causes the processor 701 to execute the method described in the preceding embodiments.

In addition, alternatively, the above-described method may be implemented by a computer-readable storage medium, the computer-readable storage medium storing a computer-readable program instruction for implementing various embodiments of the present disclosure. The computer-readable storage medium may be a tangible device that can hold and store an instruction to be used by an instruction execution device. The computer-readable storage medium, for example, may be, but is not limited to, an electrical storage device, a magnetic storage device, an optical storage device, an electromagnetic storage device, a semiconductor storage device, or any suitable combination thereof. More specific examples (a non-exhaustive list) of computer-readable storage media include: portable computer disk, hard disk, random-access memory (RAM), read-only memory (ROM), erasable programmable read-only memory (EPROM or flash memory), static random-access memory (SRAM), portable compact disk read-only memory (CD-ROM), digital versatile disk (DVD), memory stick, floppy disk, mechanical encoding device, for example, a punch card or a protruding structure in a groove that stores an instruction thereon, and any suitable combination thereof. A computer-readable storage medium used herein is not interpreted as a transient signal itself, such as a radio wave or any other freely propagating electromagnetic wave, an electromagnetic wave propagating through a waveguide or any other transmission medium (for example, a light pulse passing through a fiber optic cable), or an electrical signal transmitted through a wire.

Therefore, in another embodiment, the present disclosure proposes a computer-readable storage medium, the computer-readable storage medium containing a computer-executable instruction stored thereon, the computer-executable instruction being used to implement the methods in various embodiments of the present disclosure.

In another embodiment, the present disclosure provides a computer program product, the computer program product is tangibly stored in a computer-readable medium and comprises computer-executable instructions, and when the computer-executable instructions are executed, at least one processor executes the method in the embodiments of the present disclosure.

Generally, various example embodiments of the present disclosure may be implemented in hardware or dedicated circuits, software, firmware, logic, or any combination thereof. Some aspects may be implemented in hardware, while other aspects may be implemented in firmware or software that may be executed by a controller, microprocessor, or other computing equipment. When various aspects of the embodiments of the present disclosure are illustrated or described as block diagrams or flowcharts, or represented by some other graphs, it is understandable that the blocks, devices, systems, techniques, or methods described herein may, as non-limiting examples, be implemented in hardware, software, firmware, dedicated circuits or logic, general-purpose hardware or controllers or other computing equipment, or a combination thereof.

A computer-readable program instruction or computer program product used to execute various embodiments of the present disclosure may also be stored on the cloud. When needed, a user can, through the mobile Internet, a fixed network, or another network, access a computer-readable program instruction stored on the cloud for implementing an embodiment of the present disclosure, so as to implement the technical solutions disclosed according to various embodiments of the present disclosure.

While the present disclosure has been described above by reference to several specific embodiments, it should be understood that embodiments of the present disclosure are not limited to the specific embodiments disclosed. Embodiments of the present disclosure are intended to cover various modifications and equivalent arrangements included within the spirit and scope of the appended claims. The scope of the claims conforms to the broadest interpretation, thus including all such modifications and equivalent structures and functions.

The invention claimed is:

1. A method for acquiring data of a data source associated with a production line, comprising:
   memory, configured to store computer-executable instructions which, when executed, enable a processor to execute,
   acquiring a semantic model, the semantic model including semantic relationships between each of a plurality of semantic units and corresponding data source identifiers of at least one production;
   receiving production line identifiers and acquiring at least one semantic unit, converting the at least one semantic unit to corresponding data source identifiers of production lines indicated by the production line identifiers based on the semantic model; and
   acquiring data of the data sources indicated by the data source identifiers wherein the acquiring of the semantic model comprises,
   establishing a virtual model of the at least one production line based on characteristic information and production sequence of constituent parts of the at least one production lines,
   creating a contextual information library based on the virtual model, the contextual information library including contextual information of data sources of the at least one production line, and connecting each of the plurality of semantic units and the corresponding data source identifiers of the at least one production line with semantic relationships based on the virtual model, the plurality of semantic units and the contextual information library forming the semantic model.

2. The method of claim 1, wherein acquiring data of the data sources indicated by the data source identifiers comprises:

acquiring data of the data sources indicated by the data source identifiers from a database, wherein the database stores data of data sources of the at least one production line in the form of a uniform structure.

3. The method of claim 2, further comprising:

receiving data of data sources of the at least one production line and storing the data in the database in the form of a uniform structure.

4. The method of claim 1, further comprising:

analyzing performance of the production line based on analysis rules and the data of data sources acquired to acquire an analysis result.

5. The method of claim 1, wherein the acquiring of at least one semantic unit comprises:

receiving a production line data acquisition request, and analyzing the production line data acquisition request to acquire the at least one semantic unit.

6. The method of claim 5, wherein the production line data acquisition request contains calculation formulas of KPIs and wherein the method further comprises:

calculating the KPIs based on the calculation formulas and the data of data sources acquired, to acquire a calculation result.

7. The method of claim 1, wherein the data source identifier includes at least one of network address of a data source, identification code of the data source and attribute of the data source.

8. A device for acquiring data of data sources associated with a production line, comprising:

a model acquisition model, configured to acquire a semantic model, the semantic model including semantic relationships between each of a plurality of semantic units and corresponding data source identifiers of at least one production line;

a receiving unit, configured to receive production line identifiers and acquire at least one semantic unit;

a conversion unit, configured to convert the at least one semantic unit to the corresponding data source identifiers of the at least one production line indicated by the production line identifiers based on the semantic model; and a data acquisition unit, configured to acquire data of the data sources indicated by the data source identifiers wherein the acquiring of the semantic model comprises, establish a virtual model of the at least one production line based on characteristic information and production sequence of constituent parts of the at least one production lines, creating a contextual information library based on the virtual model, the contextual information library including contextual information of data sources of the at least one production line, and connect each of the plurality of semantic units and the corresponding data source identifiers of the at least one production line with semantic relationships based on the virtual model, the plurality of semantic units and the contextual information library forming the semantic model.

9. The device of claim 8, wherein the data acquisition unit is further configured to:

acquire data of the data sources indicated by the data source identifiers from a database, wherein the database stores data of data sources of the at least production line in a form of a uniform structure.

10. The device of claim 9, further comprising:

an interaction unit, configured to receive data of data sources of the at least one production line and store the data in the database in the form of a uniform structure.

11. Computing equipment, the computing equipment comprising:

the processor, and the memory, configured to store computer-executable instructions which, when executed, enable the processor to execute the method of claim 1.

12. A non-transitory computer-readable storage medium, storing computer-executable instructions, the computer-executable instructions, when executed by at least one processor, configure the at least one processor to execute the method of claim 1.

13. A non-transitory computer program product being tangibly stored in a non-transitory computer-readable storage medium, storing computer-executable instructions which, when executed by at least one processor, enable at least one processor to execute the method of claim 1.

14. The method of claim 2, wherein the acquiring data of the data sources indicated by the data source identifiers comprises:

acquiring data of the data sources indicated by the data source identifiers from a database, wherein the database stores data of data sources of the at least one production line in the form of a uniform structure.

15. The method of claim 14, further comprising:

receiving data of data sources of the at least one production line and storing the data in the database in the form of a uniform structure.

16. The method of claim 2, further comprising:

analyzing performance of the production line based on analysis rules and the data acquired of data sources, to acquire an analysis result.

17. Computing equipment, the computing equipment comprising:

a processor, and a memory, configured to store computer-executable instructions which, when executed, enable the processor to execute the method of claim 2.

18. Computing equipment, the computing equipment comprising:

the processor, and the memory, configured to store computer-executable instructions which, when executed, enable the processor to execute the method of claim 2.

* * * * *